United States Patent [19]

Travers et al.

[11] Patent Number: 5,231,635
[45] Date of Patent: Jul. 27, 1993

[54] MULTIPLEXED TRANSMISSION SYSTEM FOR SUBSCRIBER UNITS OF DIFFERENT TYPES

[75] Inventors: Jean-Francois Travers, Lannion; Jacques Briand, Minihy-Treguier; Yvon Guedes, Lannion, all of France

[73] Assignee: U.S. Philips Corporation, New York, N.Y.

[21] Appl. No.: 772,897

[22] Filed: Oct. 4, 1991

[30] Foreign Application Priority Data

Oct. 9, 1990 [FR] France ............................ 90 12416

[51] Int. Cl.⁵ ........................................... H04J 3/12
[52] U.S. Cl. .................................. 370/95.1; 370/95.3; 370/110.1; 379/58; 379/63; 455/33.1; 455/88; 455/89
[58] Field of Search ................... 370/95.1, 95.3, 110.1; 379/58, 63; 455/88, 89, 33.1

[56] References Cited

U.S. PATENT DOCUMENTS

| | | | |
|---|---|---|---|
| 4,712,229 | 12/1987 | Nakamura | 379/58 |
| 4,942,570 | 7/1990 | Kotzin et al. | 370/110.1 X |
| 5,025,442 | 6/1991 | Lynk et al. | 370/110.1 X |

FOREIGN PATENT DOCUMENTS 0261127  3/1988  European Pat. Off. .

OTHER PUBLICATIONS

39th IEEE Vehicular Technology Conference, vol. II, May 1989, San Francisco, Calif., pp. 712–717.
International Switching Symposium, vol. 3, Mar. 1987, Phoenix, Ariz., pp. 759–765.
European Search Report.

*Primary Examiner*—Douglas W. Olms
*Assistant Examiner*—Russell W. Blum
*Attorney, Agent, or Firm*—David R. Treacy

[57] ABSTRACT

A plurality of subscriber units are connected to at least two transceiver stations for exchanging information in a time division multiple access mode, in which traffic time intervals are allocated in rotation to a variable number C of channels, where C is dependent on the number and type of units to be connected. T intervals plus one control time interval form a frame, where T is mutually prime with respect to the numbers 2 through $C_{MAX}$. M frames form a superframe, where M is the lowest common multiple of the numbers 1 through $C_{MAX}$.

12 Claims, 6 Drawing Sheets

C=1

| XCCH | 0 | 0 | 0 | 0 | | | 0 |
|---|---|---|---|---|---|---|---|

C=2

| XCCH | 0 | 1 | 0 | 1 | | | 0 |
|---|---|---|---|---|---|---|---|
| XCCH | 1 | 0 | 1 | | | | 1 |

C=3

| XCCH | 0 | 1 | 2 | 0 | 1 | 2 | | | 0 |
|---|---|---|---|---|---|---|---|---|---|
| XCCH | 1 | 2 | 0 | 1 | 2 | | | | 1 |
| XCCH | 2 | 0 | 1 | 2 | | | | | 2 |

C=4

| XCCH | 0 | 1 | 2 | | | | | 2 |
|---|---|---|---|---|---|---|---|---|
| XCCH | 3 | 0 | 1 | 2 | | | | 1 |
| XCCH | 2 | 3 | 0 | 1 | 2 | | | 0 |
| XCCH | 1 | 2 | 3 | 0 | 1 | 2 | | 3 |

C=5

| XCCH | 0 | 1 | | | | | | 3 |
|---|---|---|---|---|---|---|---|---|
| XCCH | 4 | 0 | 1 | | | | | 2 |
| XCCH | 3 | 4 | 0 | 1 | | | | 1 |
| XCCH | 2 | 3 | 4 | 0 | 1 | | | 0 |
| XCCH | 1 | 2 | 3 | 4 | 0 | 1 | | 4 |

C=6

| XCCH | 0 | 1 | 2 | 3 | 4 | 5 | | 0 |
|---|---|---|---|---|---|---|---|---|
| XCCH | 1 | 2 | 3 | 4 | 5 | | | 1 |
| XCCH | 2 | 3 | 4 | 5 | | | | 2 |
| XCCH | 3 | 4 | 5 | | | | | 3 |
| XCCH | 4 | 5 | | | | | | 4 |
| XCCH | 5 | | | | | | | 5 |

FIG. 7

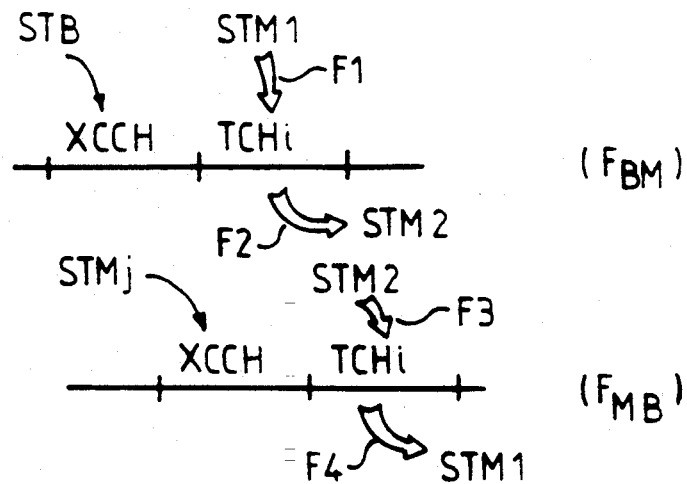
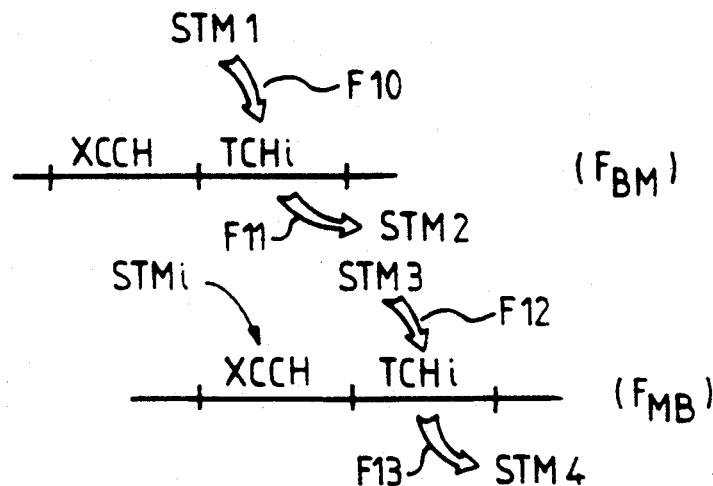

MULTIPLEXED TRANSMISSION SYSTEM FOR SUBSCRIBER UNITS OF DIFFERENT TYPES

CROSS-REFERENCE TO RELATED APPLICATION

This application is related to subject matter disclosed in a patent application filed concurrently by applicants for "Time-Division Multiplex Information Transmission System Having a Variable Structure" Ser. No. 722,811.

FIELD OF THE INVENTION

The present invention relates to a transmission system comprising a plurality of subscriber units connected to at least two transceiver stations exchanging information in a time-division multiplex mode transmitted over a time-division multiplex radio channel in which a plurality of series of T traffic time intervals occur. These time intervals are to be allocated to a variable number C of channels depending on the number and type of subscriber arrangements to be connected.

Such a system finds important applications, more specifically, in the transmission system utilizing radio links.

BACKGROUND OF THE INVENTION

A prior-art system is described in European Patent Application 0 261 127. Although this system provides advantages with respect to its possibilities to adapt to different speech coders/decoders available on the market by allocating a convenient number of time intervals to each channel, it is estimated, however, that this prior-art system does not properly manage the use of these channels.

Thus, because this system has the structure in which one transceiver station is considered the base station and the other transceiver stations the auxiliary stations usually portable or radio stations on board mobile vehicles, it requires the intervention of the base station for the exchange of traffic information between two of the auxiliary stations. This is considered a disadvantage because the traffic is increased by the information exchanges between auxiliary station/base station and base station/auxiliary station.

This is all the more disadvantageous because these systems are private radio transmission systems (as opposed to public systems) where the radio resources (reduced bandwidth frequency channels) are sparsely distributed.

SUMMARY OF THE INVENTION

In order to provide a proper management of radio means, the transmission system mentioned in the preamble is characterized in that a control time interval is provided situated between these series of time intervals.

BRIEF DESCRIPTION OF THE DRAWINGS

The following description with respect to the annexed drawings all given by way of a non-limiting example, will make it better understood how the invention can be realised, in which:

FIG. 7 shows another way of how the control time interval is inserted according to the invention; and FIGS. 8a and 8b show how a full-duplex or half-duplex link is set up.

DESCRIPTION OF (PREFERRED) EMBODIMENTS.

Figure 1:
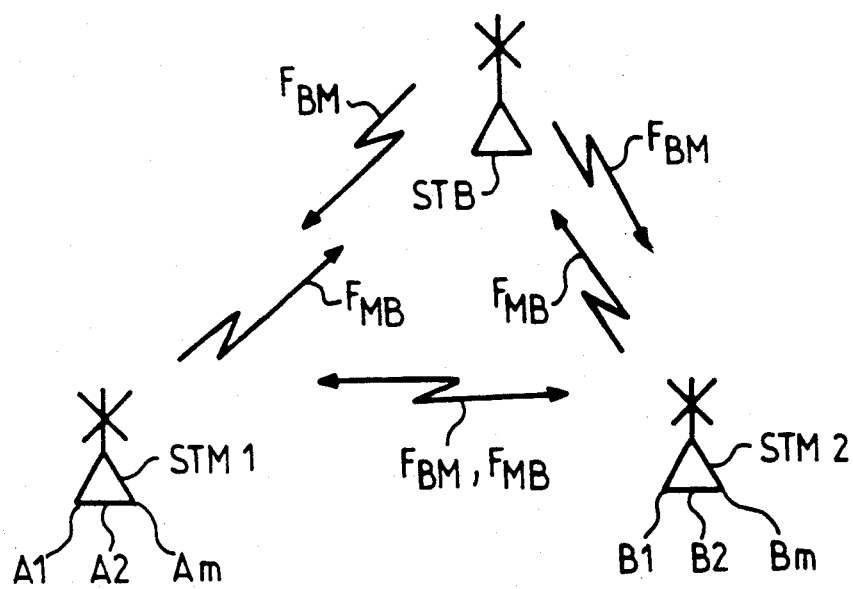
FIG. 1 shows a tranmission system in accordance with the invention.

FIG. 1 shows a system according to the invention. This system is formed by a set of transceiver stations STB, STM1 and STM2. Needless to observe that the number of stations may be any number. STB is a base transceiver station, STM1 and STM2 are auxiliary stations, that is to say, managed by the base station. In practice, the base station is a fixed station, whereas the stations STM1 and STM2 are portable stations or stations on board mobile vehicles. To the mobile station STM1 are connected a plurality of subscriber units or sets A1, A2, ..., Am and to the mobile station STM2 a plurality of subscriber units or sets B1, B2, ..., Bn. The stations communicate among each other over radio links which use two frequency channels $F_{BM}$ and $F_{MB}$.

Generally, the channel $F_{BM}$ is used by communications in the direction from the base station STB to the mobile stations STM1 and STM2 and the channel $F_{MB}$ by the communications from the mobile stations to the base station. The communications established over these frequency channels are organised in a time-division multiplex mode of the TDMA type which provides communication channels further termed time-division channels.

For a proper understanding of the interest of the invention it is useful to explain several notions.

In effect, a distinction is to be made between the mode of communication and type of communication.

The mode of communication is termed duplex when the communication between two subscribers of the stations STM1 and STM2 respectively, passes through the base station STB. In that case the two frequency channels are used, the channel $F_{MB}$ also termed upstream channel and the channel $F_{BM}$ also termed downstream channel.

The mode of communication is termed half-duplex when the communication takes place directly between the two mobile stations.

The type of communication is called duplex (or full-duplex) if the subscribers of the mobile stations can transmit or receive (talk or listen) simultaneously, which is realised, for example, within the concept of this invention, by dividing the channel in time (that is to say, one time interval for speaking and another time interval for listening).

The type of communication is called half-duplex if the subscribers of the stations can only transmit or receive in the same time interval.

Because the subscriber sets may have different formats of data to be received or transmitted, the TDMA frames may allocate time-division channels to more or fewer time intervals in a manner which will be explained hereinafter.

Figure 2:
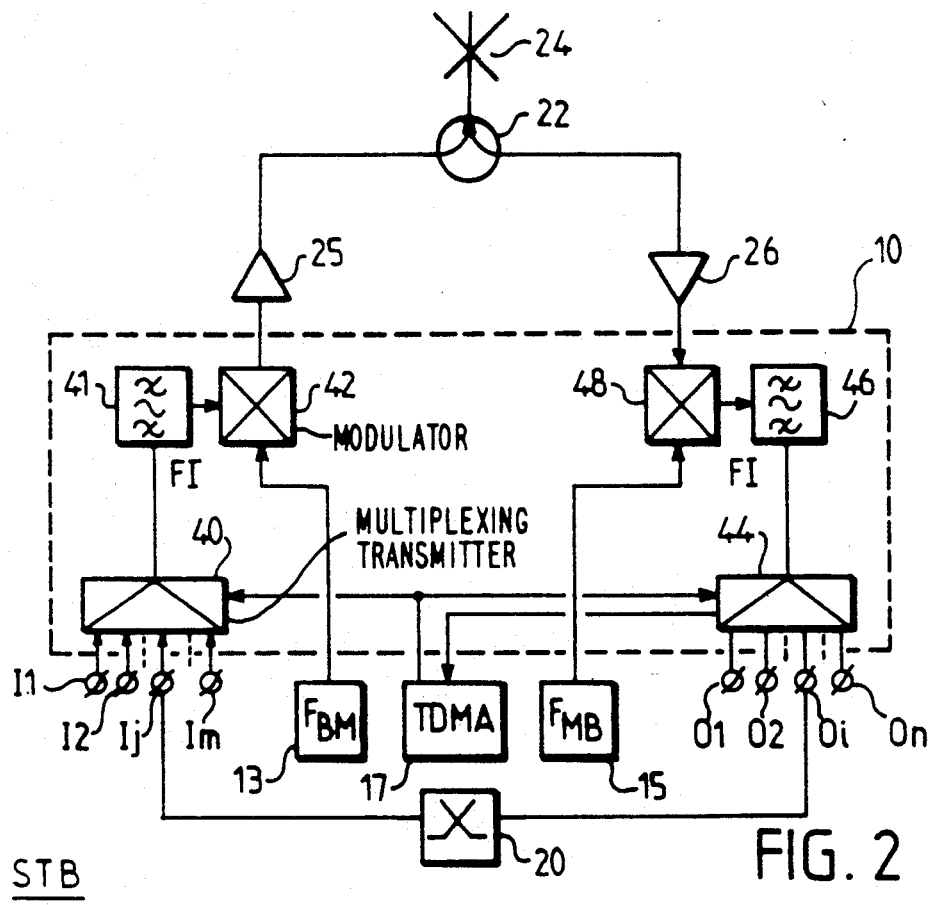
FIG. 2 shows the diagram of what is commonly referred to as a base station.

FIG. 2 shows a block diagram of the base station STB.

It is formed by a transceiver set 10 controlled by two reference oscillators 13 and 15 oscillating with the frequencies $F_{MB}$ and $F_{BM}$. This set creates a TDMA frame by means of a frame generator 17. Subscriber sets or other links may be connected to input ports, I1, I2, ..., Im and output ports 01, 02, ..., 0n. A connecting element 20 connecting the outputs 0i to the inputs Ij makes it possible to establish communications between mobile stations which communications pass through the base station (duplex mode). A duplex filter 22 makes it possible to transmit with a frequency $F_{MB}$ and receive with the frequency $F_{BM}$ different from $F_{MB}$ over the same aerial 24. A transmitter amplifier 25 and a receiver amplifier 26 are connected to this coupler 22.

The set 10 is formed by a multiplexing transmitter section 40 cooperating with a filter 41, centered at an intermediate frequency FI, and a modulator 42. The modulator centers the information signals produced by the section 40 at the carrier frequency fixed by the oscillator 13. The section 40 arranges the information signals to be transmitted in accordance with the commands given by the TDMA frame generator 17, and phase, frequency or amplitude modulates the information signals on an intermediate frequency FI. This frame generator 17 makes it also possible to recover the different information signals contained in the TDMA frame received by a receiver ensemble 44. The input of this ensemble is connected to the output of a filter, centered at the frequency FI, connected to the output of a demodulator 48. This demodulator 48 receives the signals from the amplifier 26 and the oscillator 15. The outputs 01, ... 0n are constituted by the outputs of the ensemble 44.

Figure 3:
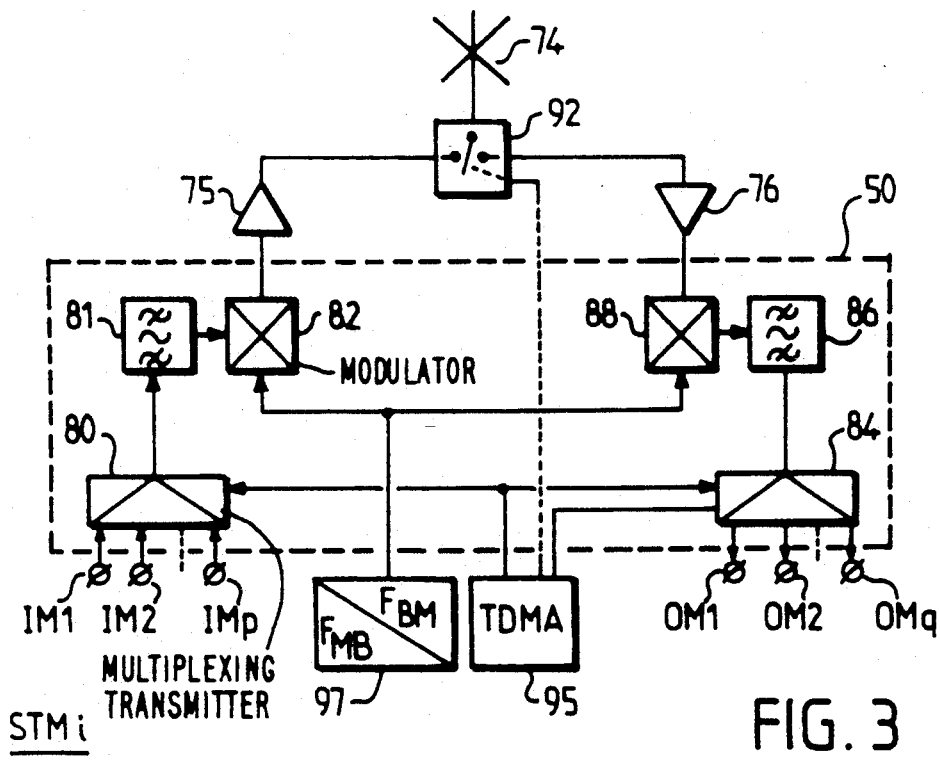
FIG. 3 shows the diagram of an auxiliary station.

The block diagram of one of said mobile stations STMi is shown in FIG. 3. This station is formed in a similar manner to that of the base station with respect to the elements 74, 75, 76, 50, 80, 81, 82, 84, 86, 88 which are to be compared to the elements 24, 25, 26, 10, 40, 41, 42, 44, 46, 48 of FIG. 2. The differences relate to the aerial coupling, the reference oscillator and the frame generator:

The connection to the aerial is realised by means of a switch (diode switch) 92 controlled by the frame generator 95 depending on whether transmission or reception takes place. A switch is used in lieu of a duplex filter for reasons of costs of the mobile stations; the duplex communications are realised by means of time-division (a time interval for transmission with $F_{MB}$ and another time interval for reception with $F_{BM}$). This will be explained in more detail hereinafter with the description of FIG. 8.

The reference oscillator 97 may generate frequencies equal to $F_{MB}$ for transmission ($F_{BM}$ for reception) in the duplex communication mode and $F_{MB}$ or $F_{BM}$ for transmission ($F_{BM}$ or $F_{MB}$ for reception) in the half-duplex communication mode. The frequency change is made possible by a frequency synthesizer capable of generating frequencies equal to $F_{BM}$ or $F_{MB}$ and constituting the generator 97.

The TDMA frame generator 95 controls the sections 80 and 84, and also the choice between the frequencies $F_{BM}$ and $F_{MB}$ and the aerial switch 92.

The input ports for the subscriber sets are referenced IM1, IM2, ..., IMp and the output ports OM1, OM2, ..., OMq.

Figure 4:
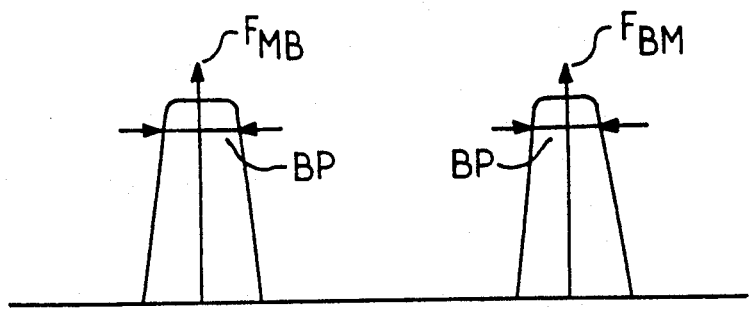
FIG. 4 shows the spectral position of the frequency channels used by the system.

FIG. 4 shows the frequency channels centered around the carrier frequencies $F_{MB}$ and $F_{BM}$, used to accommodate TDMA frames.

The passband BP around these carrier frequencies is 25 kHz. The carrier frequencies are included in the band ranging from about 400 MHz to 900 MHz.

Figure 5:
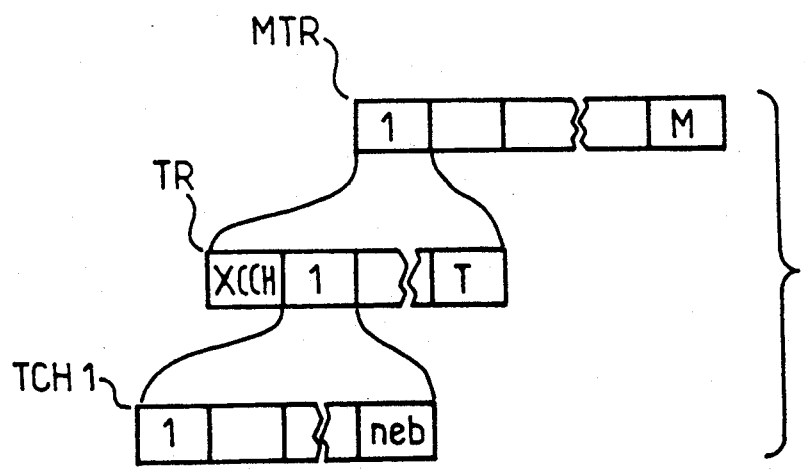
FIG. 5 shows the organisation of the multiplex mode.

FIG. 5 shows the organisation of this TDMA transmitted sequence. It is constituted by a multi-frame MTR formed by a plurality of M frames TR in turn consisting of T time intervals TCHi (i=1, ..., T) and also a time interval XCCH. The time interval XCCH is used for organising the transmitted sequence, whereas the time intervals TCHi are there for transmitting the useful traffic. Each of these time intervals $TCH_1$ to $TCH_T$ comprises $n_{eb}$ bits.

Within the scope of the described example the multiplex is to be adapted to different speech coders and decoders connected to the subscribers and to different data transmission sets transmitting at different rates. These coders/decoders operate with rates of 2.4 kbit/s, ..., 13 kbit/s. The transmitted sequence thus to be capable of presenting C time-division channels C=1, ..., $C_{MAX}$, $C_{MAX}=6$, where:
M=60 frames per multi-frame,
T=19 time intervals TCH per frame, that is to say, a total of 20 intervals including the time interval XCCH,
neb=190 bits, 46 of which are used for recovering 144 traffic bits and for communication management (synchronization, state of the subscriber, off-hook or on-hook..).

Within the framework of the described example, with 200 useful traffic time intervals transmitted in one second, the array of traffic channels has a rate of 28.8 kbit/s.

M is chosen in such a way that it is the lowest common multiple of the numbers 1 to $C_{MAX}$.

According to the invention, the value T is mutually prime with respect to the numbers 2 ..., $C_{MAX}$; that is, none of the numbers 2 ..., $C_{MAX}$ is a factor of T.

Figure 6:
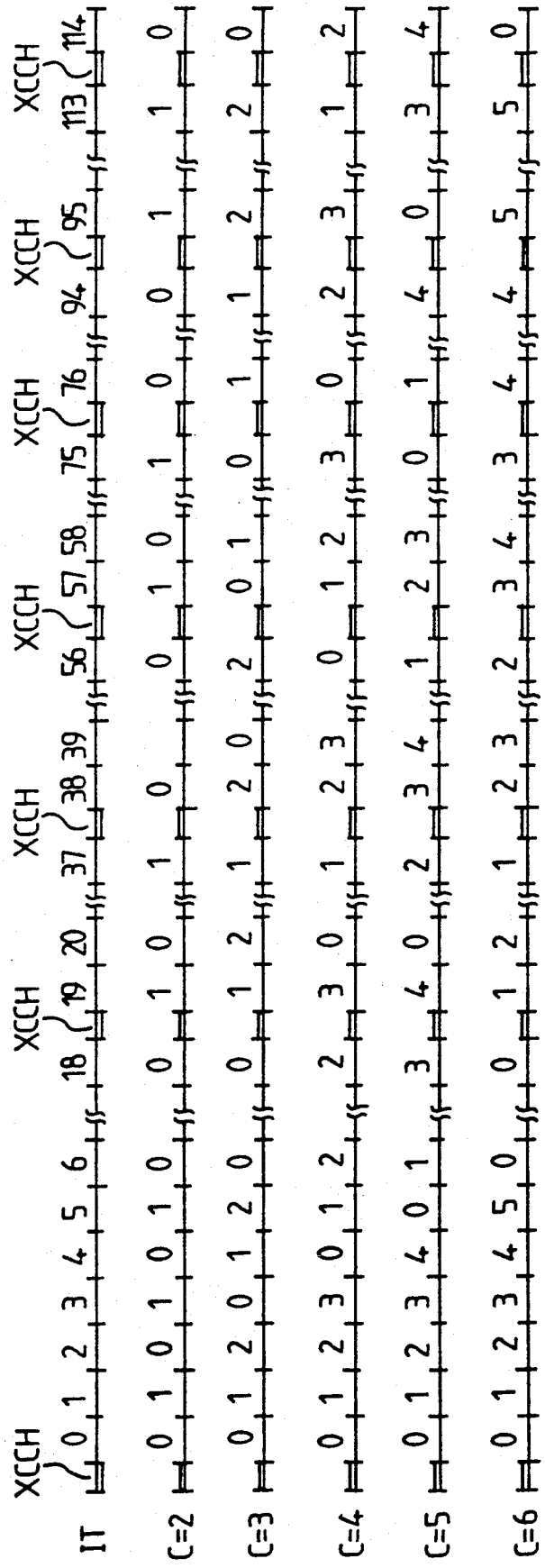
FIG. 6 shows how the control time interval according to the invention is inserted.

Thus, a variation or a channel rotation is obtained around the time interval XCCH; that is to say, that all the channels are directly to precede (or directly succeed) the channel XCCH once every C times. This is represented in FIG. 6 for C=2, ..., 6.

Although in this example the value T is equal to 19, other values may also be suitable, for example, T=7, 11, ..., 23, ... The value T is finally fixed by the rate one wishes to give to the control channel XCCH and to the efficiency of the rate of channel XCCH relative to the overall rate. Preferably, the time interval XCCH has a number of bits also equal to neb which facilitates the synchronization operations.

In this Figure the different time intervals IT are denoted by means of a continuous numeration which disregards the frames. The time intervals XCCH are represented by a double line.

FIG. 7 shows this variation in a different manner.

Due to this variation each channel is sure to obtain the information signals transmitted by the base station in XCCH ($F_{BM}$), in this case once every C, and to transmit in the direction of the base station in XCCH ($F_{MB}$) once every C (FIG. 8).

In effect, the time intervals XCCH being shifted, the mobile station which transmits to the base station in the time interval TCH ($F_{MB}$), simultaneously with a time interval XCCH ($F_{BM}$), is unable to receive the information signals coming from this time interval XCCH ($F_{BM}$). The mobile station, however, may transmit in the next time interval, that is to say, XCCH ($F_{MB}$).

In the same fashion any mobile station which is to receive in the time interval TCH ($F_{BM}$), following the time interval XCCH ($F_{BM}$) of the base station, is unable to transmit over the channel XCCH ($F_{MB}$). However, it has been able to receive the information signals transmitted by the base station in the time interval XCCH ($F_{BM}$).

Thus, the variation of the channels relative to the time interval XCCH makes it possible at one instant to receive the information signals transmitted by the base station (XCCH with $F_{BM}$) and at another instant to transmit the information signals in the direction of the base station (XCCH with $F_{MB}$).

The time interval XCCH may find important applications.

It makes a communication in the half-duplex mode possible without intervention of the base station. This is made possible if the base station with the downstream frequency $F_{BM}$ leaves 1 or 2 time intervals free, that is to say, that it does not transmit during this time interval and that it reserves one or two time intervals with the upstream frequency $F_{MB}$. This being observed, the mobile stations are to remain synchronized with the base station in order not to overlap in the adjacent time intervals. This is rendered possible if the base station is sure to transmit in several time intervals, which are the time intervals XCCH ($F_{BM}$) used both as a resynchronization time interval and a control time interval. These control time intervals are also used for synchronizing half-duplex communications.

This case is shown in a diagram in FIG. 8 in which the time interval XCCH is represented. In this time interval the station STB may transmit to the mobile stations in the TDMA multiplex mode transmitted with the frequency $F_{BM}$ and it may receive information signals coming from the TDMA frame transmitted in the multiplex mode with the frequency $F_{MB}$.

The time intervals TCHi allocated to the mobile stations communicating in half-duplex, make it possible more or less to communicate as a function of their type: for the full-duplex mode (FIG. 8a) in a time interval TCHi, the mobile station STM1 transmits with $F_{BM}$, arrow F1, whereas the mobile station STM2, arrow F2, listens with the same frequency and, reciprocally, in another time interval the mobile station STM2 transmits with $F_{MB}$, arrow F3, whereas STM1 listens with the same frequency, arrow F4. for the half-duplex mode (FIG. 8b) in a time interval TCHi, the mobile station STM1 transmits with $F_{BM}$, arrow F10, in the direction of STM2, arrow F11, and in another time interval the mobile station STM3 transmits with $F_{MB}$, arrow F12, in the direction of STM4, arrow F13. In this manner the capacity of the RF channel has been augmented by a factor of 2 on the basis of the same TDMA frame.

We claim:

1. A transmission system comprising a plurality of subscriber units connected to at least two transceiver stations for exchanging information in a time-division multiplex mode, said information being transmitted in a plurality of series of T traffic time intervals which are allocated to a variable number C of channels depending on the number and type of subscriber units to be connected, characterized in that a control time interval is provided between each of said series of T time intervals, the number of channels is less than or equal to $C_{MAX}$, and in that T is a number which is mutually prime with respect to all the numbers $C=2, \ldots, C_{MAX}$.

2. A system as claimed in claim 1, characterized in that each said series of T time intervals and a respective one of said control time intervals adjoining the series constitute a frame, and information is transmitted as a multi-frame having M frames, where M is the lowest common multiple of the numbers $C=1, \ldots, C_{MAX}$.

3. Transmission system as claimed in one of the claim 1, comprising a first transceiver station called the base station and at least two transceiver stations called mobile stations, characterized in that the information signals are transmitted directly by the mobile stations in traffic time intervals, whereas the control information signals for setting up and terminating the communication are transmitted to and from the base station in said control time intervals.

4. Transmission system as claimed in claim 3, comprising a first transceiver station termed base station and at least two transceiver stations termed mobile stations, characterized in that the control time interval can be used for communications in the half-duplex mode, for transmitting information signals from mobile station to mobile station without the intervention of the base station, these communications being synchronized with and under the control of the base station in the same control time interval, the base station in this case managing establishing or terminating the communication and the distribution of the frequencies and time intervals.

5. Transmission system as claimed in claim 1, comprising a first transceiver station termed base station and at least two transceiver stations termed mobile stations, characterized in that the control time interval can be used for communications in the half-duplex mode for transmitting information signals from the mobile station to mobile station without the intervention of the base station, these communications being synchronized with and under the control of the base station in the same control time interval, the base station in this case managing establishing or terminating the communication and the distribution of the frequencies and time intervals.

6. Transmission system as claimed in claim 2, comprising a first transceiver stations termed mobile stations, characterized in that the control time interval can be used for communications in the half-duplex mode for transmitting information signals from the mobile station to mobile station without the intervention of the base station, these communications being synchronized with and under the control of the base station in the same control time interval, the base station in this case managing establishing or terminating the communication and the distribution of the frequencies and time intervals.

7. Transmission system as claimed in claim 2, comprising a first transceiver station called the base station and at least two transceiver stations called mobile stations, characterized in that the information signals are transmitted directly by the mobile stations in traffic time intervals, whereas the control information signals for setting up and terminating the communication are transmitted to and from the base station in said control time intervals.

8. Transmission system as claimed in claim 7, comprising a first transceiver station termed base station and at least two transceiver stations termed mobile stations, characterized in that the control time interval can be used for communications in the half-duplex mode for transmitting information signals from the mobile station to mobile station without the intervention of the base station, these communications being synchronized with and under the control of the base station in the same control time interval, the base station in this case managing establishing or terminating the communication and the distribution of the frequencies and time intervals.

9. A transmission system comprising a plurality of subscriber units connected to at least two transceiver stations for exchanging information in a time-division multiplex mode, said information being transmitted in a plurality of series of T traffic time intervals which are allocated to a variable number C of channels depending on the number and type of subscriber units to be connected, characterized in that a control time interval is provided between each of said series of T time intervals, the number of channels is less than or equal to $C_{MAX}$, and each said series of T time intervals and a respective one of said control time intervals adjoining the series constitute a frame, and information is transmitted as a multi-frame having M frames, where M is the lowest common multiple of the numbers $C = 1, \ldots, C_{MAX}$.

10. Transmission system as claimed in claim 9, comprising a first transceiver station called the base station and at least two transceiver stations called mobile stations, characterized in that the information signals are transmitted directly by the mobile stations in traffic time intervals, whereas the control information signals for setting up and terminating the communication are transmitted to and from the base station in said control time intervals.

11. Transmission system as claimed in claim 10, comprising a first transceiver station termed base station and at least two transceiver stations termed mobile stations, characterized in that the control time interval can be used for communications in the half-duplex mode for transmitting information signals from the mobile station to mobile station without the intervention of the base station, these communications being synchronized with and under the control of the base station in the same control time interval, the base station in this case managing establishing or terminating the communication and the distribution of the frequencies and time intervals.

12. Transmission system as claimed in claim 9, comprising a first transceiver station termed base station and at least two transceiver stations termed mobile stations, characterized in that the control time interval can be used for communications in the half-duplex mode for transmitting information signals from the mobile station to mobile station without the intervention of the base station, these communications being synchronized with and under the control of the base station in the same control time interval, the base station in this case managing establishing or terminating the communication and the distribution of the frequencies and time intervals.

* * * * *